April 4, 1939.　　　　J. R. WATSON　　　　2,153,111
BRAKE SYSTEM COUPLER
Filed March 2, 1938　　　3 Sheets-Sheet 1
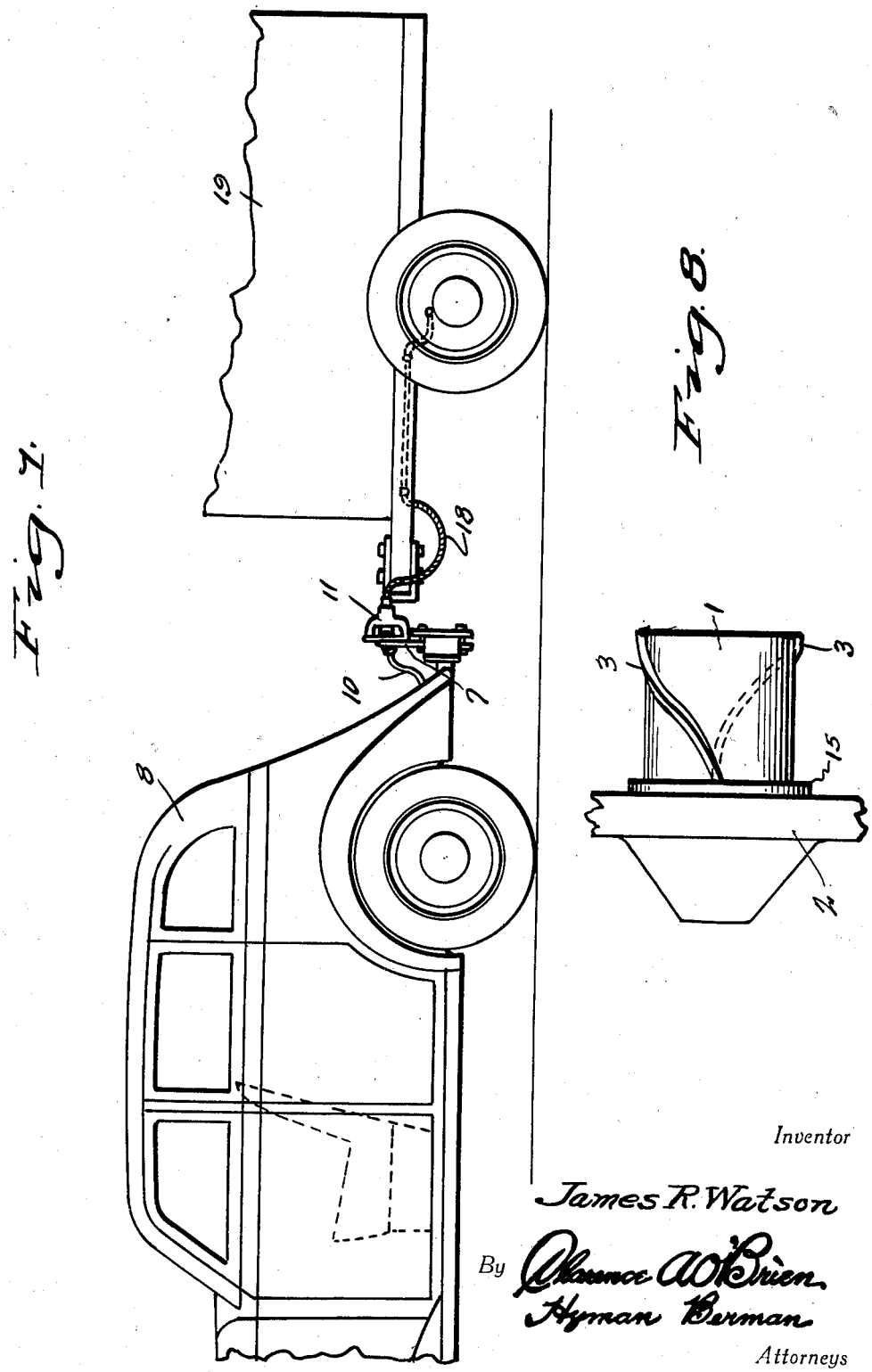
Inventor
James R. Watson
By Clarence A. O'Brien
Hyman Berman
Attorneys

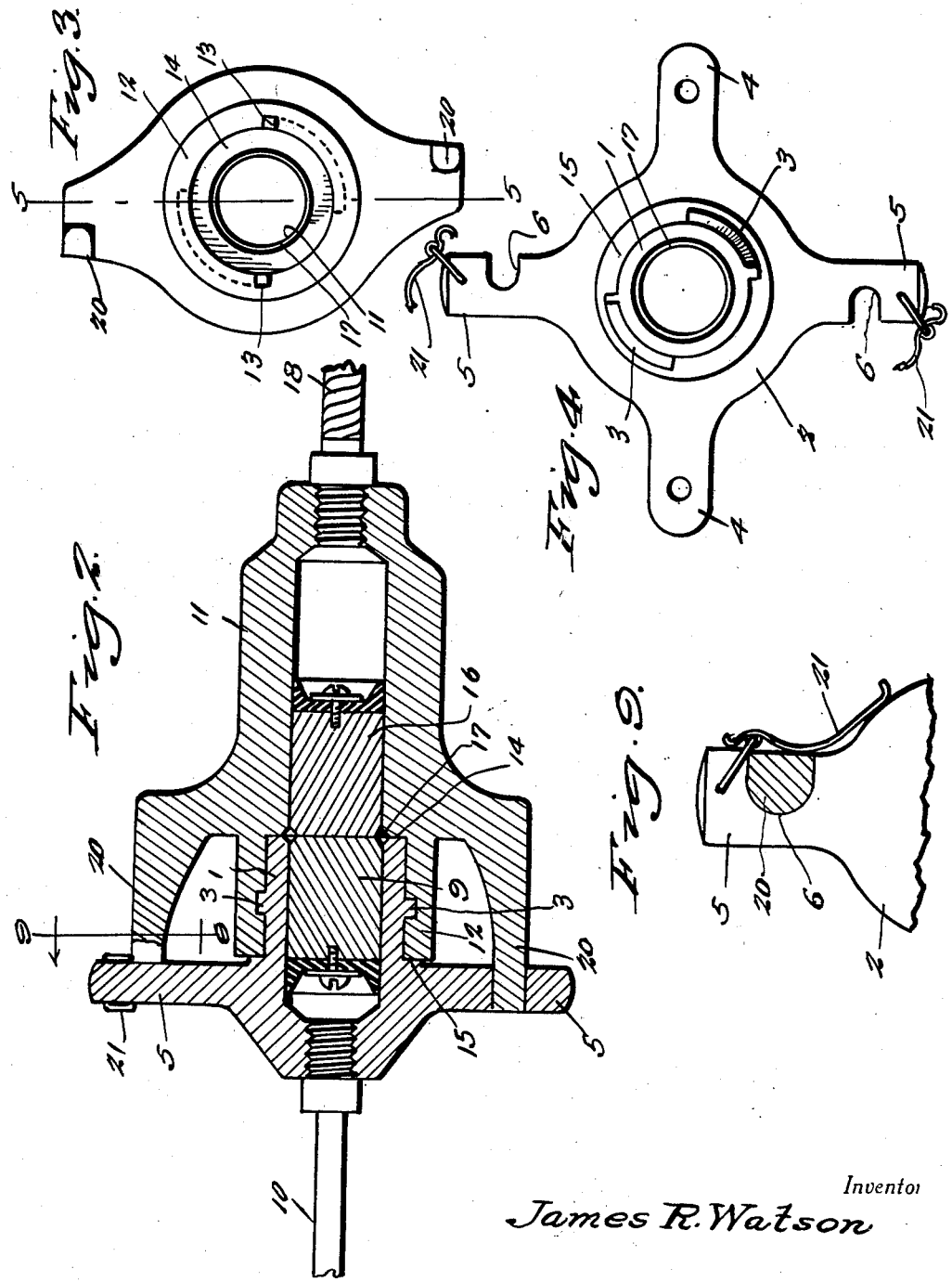

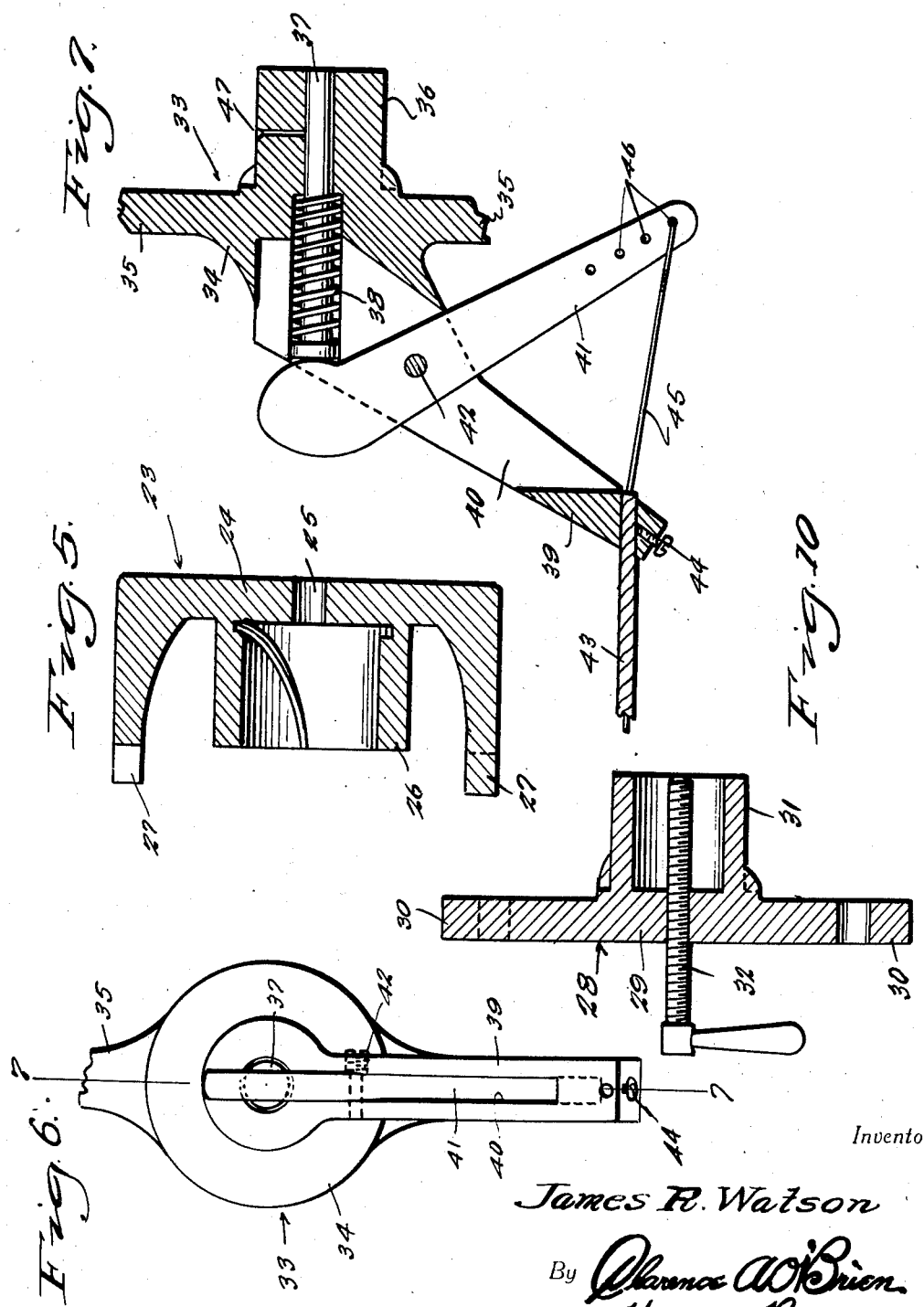

Patented Apr. 4, 1939

2,153,111

UNITED STATES PATENT OFFICE 2,153,111

BRAKE SYSTEM COUPLER

James Roy Watson, San Bernardino, Calif.

Application March 2, 1938, Serial No. 193,601

5 Claims. (Cl. 188—3)

The present invention relates to new and useful improvements in brake system couplers and has for one of its important objects to provide, in a manner as hereinafter set forth, a novel construction, combination and arrangement of parts whereby the hydraulic brakes of a trailer may be operatively connected either to the hydraulic or mechanical brake system of a tractor or towing vehicle.

Another very important object of the invention is to provide a brake system coupler of the aforementioned character which may be expeditiously disconnected when desired and, which, when disconnected, will interfere in no way with the functioning of the brake mechanism of the tractor.

Still another very important object of the invention is to provide a brake system coupler of the character described embodying means whereby the brakes of the trailer may be maintained in set or applied position if desired when the trailer is uncoupled.

Still another very important object of the invention is to provide, in a brake system coupler of the type comprising a pair of cylinders adapted for alignment with each other, novel means for detachably connecting said cylinders together.

Other objects of the invention are to provide a brake system coupler of the character set forth which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing the invention installed.

Figure 2 is a view in vertical longitudinal section through the embodiment of the invention which is provided for tractors having hydraulic brake systems.

Figure 3 is a view in front elevation of the rear cylinder which is connected to the trailer.

Figure 4 is a view in rear elevation of the cylinder which is carried by the tractor.

Figure 5 is a detail view in vertical section through the closure which is mounted on the tractor cylinder after the trailer has been disconnected.

Figure 6 is a detail view in front elevation of the unit which is mounted on the tractor when said tractor is equipped with mechanical brakes.

Figure 7 is a vertical sectional view, taken substantially on the line 7—7 of Fig. 6.

Figure 8 is a detail view in side elevation of the front cylinder.

Figure 9 is a detail view in cross section, taken substantially on the line 9—9 of Fig. 2.

Figure 10 is a view in vertical section through the closure member which is mounted on the rear cylinder when the trailer has been disconnected.

Referring now to the drawings in detail, it will be seen that the reference numeral 1 designates a front cylinder which is formed integrally with a head or plate 2. The cylinder is provided with coarse threads 3, the purpose of which will be presently set forth. Projecting from the plate 2 is a pair of apertured arms 4 and a pair of arms 5, the latter having lateral notches or recesses 6 therein. The arms 4 are adapted to be bolted or otherwise secured to a suitable bracket or attaching means 7 on the rear end of a tractor 8 in the form of the usual passenger automobile. A piston 9 is slidably mounted in the cylinder 1. A conduit 10 connects the cylinder 1 with the hydraulic brake system of the tractor 8.

The reference numeral 11 designates a comparatively long rear cylinder which is adapted to be detachably connected to the front cylinder 1 in alignment and in communication therewith. Projecting from the forward end of the cylinder 11 is an integral sleeve 12 of comparatively large diameter which is adapted to receive the cylinder 1, said sleeve 12 having internal spiral grooves 13 therein which accommodate the threads 3. The enlarged sleeve 12 provides a seat 14 on the forward end of the cylinder 11 with which the free end of the cylinder 1 is engageable. The free end of the sleeve 12 is engageable on a seat 15 which is provided therefor on the inner end portion of the cylinder 1. A piston 16 is slidably mounted in the cylinder 11. It will be observed that the pistons 9 and 16 are reversed with respect to each other. The adjacent ends of the cylinders 1 and 11 and the pistons 9 and 16 are bevelled, as at 17, to facilitate the passage of said pistons back and forth between the cylinders. A flexible conduit 18 connects the closed rear end of the cylinder 11 to the hydraulic brake system of a trailer 19.

Longitudinally extending fingers 20, integral with the cylinder 11, are engageable in the notches or recesses 6 in the arms 5. As shown to advantage in Fig. 9 of the drawings, the fingers 20 are of a cross sectional shape to conform substantially to the notches or recesses 6. Suitable clamps 21 are provided on the arms 5 for releasably securing the fingers 20 in the notches or recesses 6. This is also shown to advantage in Fig. 9 of the drawings.

As will be readily apparent, the cylinders 1 and 11 are connected by screwing the sleeve 12 on said cylinder 1. As the cylinder 11 is given approximately one quarter of a turn the fingers 20 are engaged in the notches or recesses 6 in the arms 5 and the clamps 21 are then engaged therewith, as seen in Fig. 9 of the drawings. When the hydraulic brakes of the tractor 8 are applied fluid enters the cylinder 1 through the conduit 10 and forces the piston 9, together with the piston 16, rearwardly in the cylinder 11. Of course, when the piston 16 moves rearwardly in its cylinder 11 the fluid therein is transmitted to the hydraulic brake system of the trailer 9 through the flexible conduit 18.

When the trailer is disconnected, a closure member 23 is substituted for the cylinder 11 on the cylinder 1. As illustrated to advantage in Fig. 5 of the drawings, the closure member 23 comprises a plate 24 having an opening 25 therein. Formed integrally with the plate 24 is an internally grooved sleeve 26 which is adapted to be screwed on the cylinder 1. Projecting from the plate 23 are longitudinal fingers 27 which are adapted to be releasably secured in the notches or recesses 6 of the arms 5. When the closure 23 is in position it will be seen that the piston 9 is secured against rearward movement in the cylinder 1. The piston 9 closes the opening 25.

A closure member 28 is provided for the rear cylinder 11 when the trailer is disconnected. The closure member 28 comprises a plate 29 having formed integrally therewith notched arms 30 which are substantially similar to the arms 5 for receiving the fingers 20. An externally threaded cylinder or the like 31 is formed integrally with the plate 29 and adapted to be screwed into the sleeve 12 in a manner similar to the cylinder 1. Threadedly mounted in the plate 29 and extending longitudinally into the cylinder 31 is a manually operated screw 32 which is engageable with the piston 16 for actuating same in a manner to set the trailer brakes when desired. It may be well to here state that the members 23 and 28 also prevent the entrance of dirt, water and other foreign matter into the respective cylinders 1 and 11.

When the tractor 8 is equipped with mechanical brakes, a unit designated generally by the reference numeral 33 is substituted for the front cylinder 1, the plate 3, etc. The unit 33 comprises a plate 34 which is provided with notched arms 35 similar to the arms 5 for receiving the fingers 20 of the rear cylinder 11. The plate 34 is also provided with arms (not shown) similar to the arms 4 for receiving the bracket structure 7 for mounting the unit 33 on the tractor. Formed integrally with the plate 34 is a substantially cylindrical externally threaded guide 36 which is adapted to be screwed into the sleeve 12 on the forward end of the cylinder 11. Slidably mounted in the guide 36 is a headed pin 37 which is operatively engageable with the piston 16. The pin 37 is retracted by a coil spring 38.

Formed integrally with the plate 34 is an arm 39 having a slot 40 therein. The reference numeral 41 designates a lever which is pivotally mounted, at an intermediate point, for swinging movement in the slot 40, as at 42. One end portion of the lever 41 is operatively engaged with the headed end of the pin 37. The reference numeral 43 designates a flexible housing having one end portion extending through an opening which is provided therefor in the free end portion of the arm 39 and secured therein by a set screw 44. A flexible cable or the like 45 extends through the housing 43 and connects the lever 41 to the mechanical brake apparatus of the tractor 8 for actuation thereby. The cable 45 may be adjustably connected to the lever 41 through the medium of a plurality of openings 46 in said lever.

When the mechanical brakes of the tractor 8 are applied, the lever 41 is moved through the medium of the cable 45 in a manner to actuate the pin 37 against the tension of the spring 38. When the pin 37 is thus actuated, the piston 16 is moved rearwardly thereby in the cylinder 11. A port 47 is provided in the guide 36 for lubricating the pin 37. When the member 23 is mounted on the unit 33 for protecting same when the trailer has been disconnected, the pin 37 is operable in the opening 25, thus permitting the lever 41 to swing in order that the mechanical braking system of the tractor 8 may function without interference. Of course, the sleeve 26 screws on the guide 36 and the fingers 27 are secured in the notches on the arms 35.

It is believed that the many advantages of a brake system coupler constructed in accordance with the present invention will be readily understood and although preferred embodiments of the device are as illustrated and described, it is to be understood that further changes may be resorted to which will fall within the scope of the invention as claimed.

What is claimed is:—

1. A brake system coupler of the class described comprising a cylinder open at one end, means for connecting the closed end of said cylinder to one of the brake systems, a piston operable in the cylinder, an integral sleeve extending longitudinally from the open end of the cylinder, said sleeve having internal spiral grooves, said sleeve being of greater diameter than the cylinder for providing a shoulder at the open end of said cylinder, a substantially cylindrical removable member threadedly mounted in the sleeve and engaged with the shoulder, a shoulder on said member engaged with the free end of the sleeve, means on said member operatively connected to the other brake system for actuating the piston for operating said one brake system, and coacting means on the member and the cylinder for retaining said cylinder against rotation, the last named means including arms projecting from the member, said arms having recesses therein, fingers mounted on the cylinder at right angles to the arms and engageable in the recesses, and means on the arms for releasably securing the fingers in the recesses.

2. A brake system coupler of the class described comprising a cylinder connected to one of the brake systems, a piston operable in said cylinder, a comparatively large sleeve extending longitudinally from one end of the cylinder, another cylinder threadedly mounted in said sleeve and aligned with the first named cylinder in communication therewith, a piston operable in the second and first named cylinders and adapted to actuate the first named piston, a conduit connecting the second named cylinder to the other brake system for receiving fluid therefrom for actuating the second named piston, and coacting means on the cylinders for releasably securing said cylinders against rotation relative to each other, said means including arms projecting radially from the second named cylinder, said arms having recesses therein, longitudinal fingers on the first named cylinder engageable in the recesses, and means on the arms for releasably securing said fingers in the recesses.

3. A brake system coupler of the class described comprising a cylinder operatively connected to one of the brake systems, a piston operable in said cylinder, a guide mounted on one end of the cylinder in alignment therewith, a pin slidably mounted in said guide and operatively engageable with the piston for actuating same, a lever pivotally mounted on the guide and engaged with the pin for actuating said pin, and means operatively connecting said lever to the other brake system for actuation thereby.

4. A brake system coupler of the class described comprising a cylinder operatively connected to one of the brake systems, a piston operable in said cylinder, a sleeve of comparatively large diameter extending longitudinally from one end of the cylinder, a guide threadedly mounted in said sleeve and aligned with the cylinder, radial arms on said guide having recesses therein, longitudinal fingers on the cylinder engageable in the recesses, means on the arms for releasably securing the fingers in the receesses, a spring retracted pin slidably mounted in the guide and operatively engageable with the piston for actuating said piston, another arm projecting from the guide, the last named arm having a slot therein, a lever pivotally mounted on the arm and operable in the slot, said lever being operatively engaged with the pin for actuating said pin, and means operatively connecting the lever to the other brake system for actuation thereby.

5. In a brake system coupler of the type including a cylindrical member, an element slidably mounted therein, means operatively connecting said member to one of the brake systems for actuating the element, and arms having recesses therein projecting from said member, a removable plate on one end of the member having an opening therein, a sleeve on said plate threadedly engaged with the member, and fingers on said plate engaged in the recesses of the arms and releasably secured therein.

JAMES ROY WATSON.